VISUAL SIGNALING APPARATUS FOR ELECTRONIC SWITCHING SYSTEM

Filed April 1, 1964 2 Sheets-Sheet 1

INVENTORS T. E. BROWNE
K. GOLDSCHMIDT
O. H. WILLIFORD
BY E. J. Olinder
ATTORNEY

VISUAL SIGNALING APPARATUS FOR ELECTRONIC SWITCHING SYSTEM

Filed April 1, 1964 2 Sheets-Sheet 2

United States Patent Office 3,322,907

Patented May 30, 1967

3,322,907
VISUAL SIGNALING APPARATUS FOR ELECTRONIC SWITCHING SYSTEM

Thomas E. Browne, Red Bank, and Karl Goldschmidt, New Shrewsbury, N.J., and Oscar H. Williford, Bronxville, N.Y., assignors to Bell Telephone Laboratories, Incorporated, New York, N.Y., a corporation of New York Filed Apr. 1, 1964, Ser. No. 356,421
10 Claims. (Cl. 179—175.2)

This invention relates to electronic switching systems and more particularly to the visual signaling aspects of an electronic private branch exchange (EPBX).

Substantial advances and improvements have been achieved in PBX's by the recent application of electronic switching techniques. The quality of the service has been generally enhanced, the speed of handling calls has been increased and the physical size of switching equipment installed on a subscriber's premises has been substantially reduced. Nevertheless, in some respects electronic switching systems in the prior art such as EPBX's have failed to exploit the full potential and capability of solid state circuit techniques for reducing cost, enhancing flexibility and increasing speed. For example, in visual signaling arrangements utilized for the control of busy signal lamps, the cost and complexity of the circuitry that is typically employed appears to be disproportionate to the relatively simple function that is served when compared, for example, to the apparatus employed to effect time division switching. In some prior art visual signaling arrangements, for example, additional scanning equipment has been employed to determine the supervisory state of each line and additional switching equipment responsive to signals derived by the scanning equipment has been utilized for turning ON and turning OFF the signal lamps. In effect, the visual signaling techniques in EPBX installations have lagged behind many of the advances made in other areas of EPBX development.

Accordingly, one object of this invention is to simplify visual signaling arrangements associated with electronic switching systems.

Another object is to reduce the cost of visual signaling arrangements in EPBX installations.

An additional object is to increase the speed of operation of electronic switching system visual signaling circuits.

These and other objects are realized in an illustrative embodiment of the invention that uniquely provides for the dual utilization of relatively low power, low duty cycle, high repetition rate gating pulses first to control the conductive state of talking path gates in an EPBX employing time division switching and second to control both the turning ON and the automatic turning OFF of a busy signal lamp which corresponds to the affected talking path. More specifically, in an EPBX calling signals, which may be generated by conventional rotary dialing, TOUCH-TONE dialing or by direct station selection techniques are stored, read out repetitively and translated into a uniform train of low duty cycle, high repetition rate gating pulses that are applied by means of a transformer to solid state switching or gating devices, such as PNPN diodes, for example. Time division switching is utilized and during each time slot a preselected pair of line circuits are connected together by way of a time division bus. In accordance with the principles of the invention, an extra secondary winding on the time division switch access transformer is employed to direct a small portion of the energy from each gating pulse to a special purpose signal lamp control switching device, which may be a PNPN triode, for example. The collector circuit of the triode includes an alternating current source and a signal lamp. Ground is extended to this circuit through the triode when the device is in a conducting state.

In accordance with the invention, the repetition rate of the gating pulses is substantially higher than the frequency of the alternating current source. Further, in accordance with the invention the characteristics of the switch are so selected that it is turned on in response to a gating pulse and to a coincident voltage of the proper polarity from the A.-C. source. Once turned on, the switch remains conducting, thereby lighting the signal lamp, irrespective of the subsequent absence of gating pulses so long as the polarity of the source current remains unchanged.

In accordance with another aspect of the invention, automatic turn-off of the signal lamp is achieved. This advantage is in effect inherent in the circuit arrangement employed in that the switch becomes nonconducting as soon as the polarity of the source current reverses from the "turn-on" polarity. When the polarity of the source changes once again, the switch does not immediately become conducting, however, inasmuch as the coincidence of a gating pulse and a half cycle of supply current of the proper polarity is required to effect turn-on. Thus, in the absence of a gating pulse, the lamp remains off. If gating pulses continue to be generated, indicating a busy condition on a particular talking path, the signal lamp is turned on repetitively and remains on during alternate half cycles of the A.-C. current. Thus, if a conventional 60-cycle power supply is employed a substantially steady busy light is provided.

Accordingly, a feature of the invention is the dual employment of a control signal for operating gating devices in a time division switching system and for operating a signal lamp.

Another feature of the invention is the utilization of a PNPN control switch to apply A.-C. power to a signal lamp during half cycles of a preselected polarity in response to the application of very low power, low duty cycle, high repetition rate gating pulses.

An additional feature is an automatic turn-off arrangement for a busy lamp signal in an EPBX installation based on the utilization of half cycles of A.-C. power and on the utilization of gating pulses as turn-on signals, the gating pulses being of the same polarity as the half cycles of A.-C. power.

These and additional objects and features will be fully apprehended from the following detailed description of an illustrative embodiment of the invention and from the appended drawing, in which.

Figure 1:
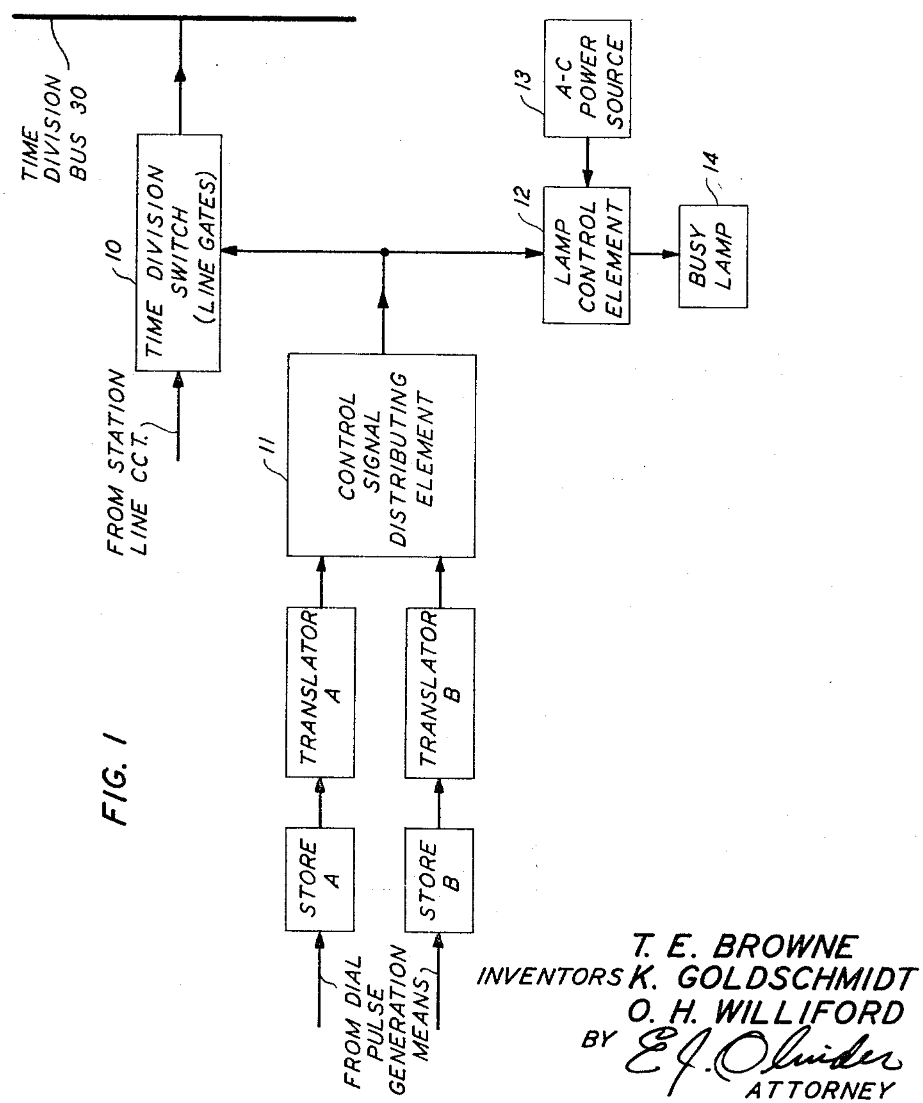
FIG. 1 is a block diagram of an EPBX busy lamp control arrangement in accordance with the invention.

An EPBX of the type to which the principles of the invention may advantageously be applied is shown in the patent application of R. C. Gebhardt, W. L. Shafer, Jr., A. E. Spencer, Jr., W. N. Toy, F. S. Vigliante, R. D. Williams, O. H. Williford, Serial No. 195,199, filled May 16, 1962, now Patent No. 3,225,144. A part of such an EPBX is shown in block form in FIG. 1. Talking paths between stations or telephones in an EPBX of the type indicated are established through electronic line gates or time division switches which provide a connection to a common time division bus. A single line gate 10 is shown in block form in FIG. 1. Signals designating a calling party are recorded in a temporary memory, such as store A and signals designating a called party are recorded in a temporary memory such as store B. The stored signals are converted to suitable control signals by translators A and B. A control signal distributing element 11 directs translator derived signals from translator A or from translator B, depending upon whether the station involved is a calling or a called party, both to time division switch 10 and to lamp control element 12. The application of power from source 13 to busy lamp 14 is controlled by lamp control element 12. As shown, the control signal output from a translator is given a dual function in accordance with the invention in that it serves both to operate time division switch 10 and also lamp control element 12.

Although the features of the instant invention pertain primarily to the dual utilization of translator outputs in the manner indicated, some additional description of the store and translator functions is desirable to promote a fuller understanding of certain aspects of applicants' invention.

A typical EPBX of the type shown by Gebhardt et al. employs a so-called "switch-unit" which includes two time division buses each with 256 connecting line gates. Broadly stated, it is the function of the line number translators to select and enable these gates. Every telephone has an appearance on both buses and accordingly a conversation path may be set up through either bus. Each switch unit includes four translator circuits, two associated with each bus. For simplicity of illustration only a single bus and a single translator pair have been indicated in FIG. 1.

In operation the line gates involved in a particular talking path are designated by two 8-bit numbers read from a time slot in store A or in store B. The numbers are delivered periodically to the translators, each of which performs a translation from 8-bit binary to 1-out-of-256. The translation is accomplished in two stages. First, the incoming 8-bit number is split into two 4-bit numbers. Each of these is translated into separate 1-out-of-16 outputs by means of logic gates (not shown).

Figure 2:
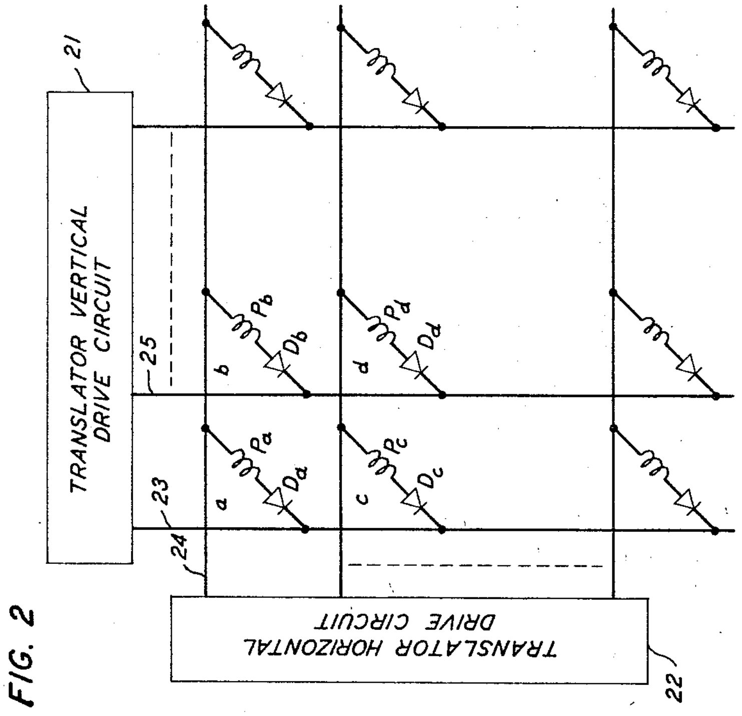
FIG. 2 is a schematic circuit diagram of a portion of one of the translators shown in block form in FIG. 1.

The two sets of 16 logic gate outputs generated by a translator connect directly to corresponding sets of 16 vertical and horizontal switches (not shown) arranged in coordinate fashion. A part of a 16x16 matrix thus defined is shown schematically in FIG. 2. At each matrix intersection, connection between a horizontal and vertical lead is provided by a coil and a polarity controlling diode. Translator vertical drive circuit 21 and translator horizontal drive circuit 22 each include a group of switches (not shown) corresponding to the horizontal and vertical conducting paths of the matrix. In operation, if switches corresponding to leads 23 and 24 are closed, intersection *a* of the matrix becomes the selected intersection. The selected horizontal lead, in this instance lead 24, carries a signal which is a positive going voltage. The selected vertical lead which in this instance is lead 23, carries a ground-going voltage and the resulting potential difference between leads 23 and 24 at intersection *a* is applied across coil $P_a$ and diode $D_a$. Depending on the particular matrix intersection selected, a similar signal may be applied instead to one of the coils $P_b$, $P_c$ or $P_d$.

As is well known in the electronic switching art, and as discussed in greater detail by Gebhardt et al. in the patent application cited above, once a dial signal has been generated and stored in the manner indicated, the signal is repetitively applied to the translator for the duration of a connection with the result that a train of low power, regularly occurring, high frequency, low duty cycle pulses is applied to that one of the matrix coils that corresponds to the particular connection being made. In one illustrative embodiment, for example, the pulse train generated in the manner indicated provides a two-microsecond pulse occurring once every 80 microseconds.

Figure 3:
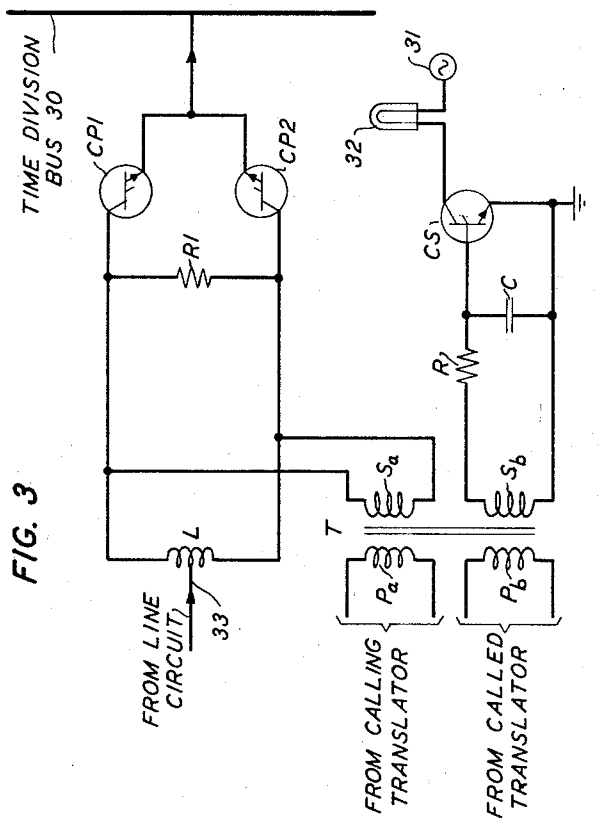
FIG. 3 is a schematic circuit diagram of a part of the system shown in block form in FIG. 1.

The specific utilization of EPBX line gate control pulses in accordance with the invention as busy lamp control pulses is shown in FIG. 3. A time division switch access transformer T has a first primary winding $P_a$ which is the matrix winding from a called party translator and a second primary winding $P_b$ which is a matrix winding from a calling party translator. In operation a pulse applied to primary winding $P_a$ or to $P_b$ is stepped up by transformer action and the corresponding pulse appearing across secondary winding $S_a$ is applied across line gates CP1 and CP2. Such pulses provide current which may be on the order of ½-ampere for example, and also provide voltage, reaching a transient peak which may typically be on the order of 50 volts, which is sufficient to break down each of the line gates CP1 and CP2. After breakdown, the pulse voltage may drop to a level of approximately 2 volts. These gates may comprise conventional solid state switching devices such as PNPN diodes, for example. The relatively high current is required in order to ensure that line gates CP1 and CP2 are maintained in a low impedance state for each speech sample that is to be applied to time division bus 31. The input side of the talking path circuit is connected to a line circuit (not shown) by a center tap 33 on inductor L. Resistor R1 provides a damping function in order to dissipate energy stored in the magnetizing inductance of transformer T during each 78 microsecond rest period that occurs between the transmission of successive speech samples.

Figure 4:
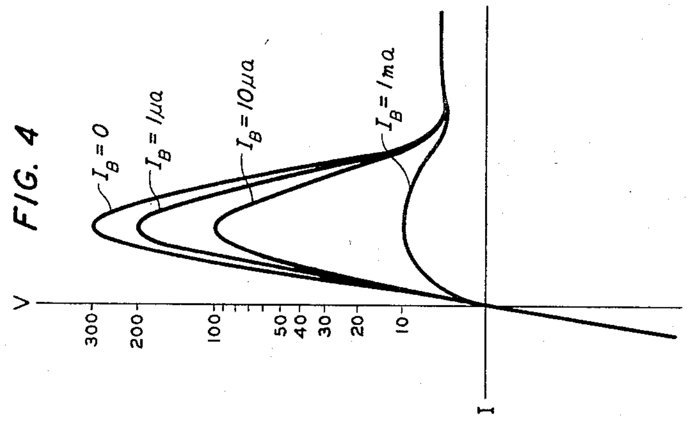
FIG. 4 is a voltage current characteristic plot of the PNPN controlled switch shown in FIG. 3.

In accordance with the invention, a small portion of the energy from the line gate control pulses is diverted from time division switch access transformer T and is employed to control the illumination of busy signal lamp 32. More specifically, a second secondary winding $S_b$ is utilized on transformer T to apply a small portion of the pulse energy across the base emitter junction of a PNPN triode CS. An understanding of the effect of the application of such pulses to switch CS is best gained by reference to FIG. 4 which shows a family of voltage-current characteristic curves for a typical PNPN switch, each curve indicating the voltage-current relationship which obtains for a particular base bias. It will be noted that in the absence of base bias when $I_B=0$, switch CS remains substantially nonconducting until a potential on the order of 300 volts is applied. With increasing base current, it is evident that lesser voltages are required to effect breakdown. Thus, for example, with a current of one milliampere, a potential of only 10 volts is required to place the device in a low impedance state. With reference to FIG. 3 it is evident, therefore, that during the application of each pulse a potential of only 10 volts is required from alternating current source 31 to break down switch CS, thus completing a path to ground for the lighting circuit of busy signal lamp 32.

In accordance with the principles of the invention, the frequency of the control pulses and the frequency of alternating current supply 31 may be readily selected to provide for a relatively steady light from signal lamp 32, despite the relatively low duty cycle of the control pulses. If, for example, a conventional 60 cycle alternating current source is employed and a typical pulse repetition rate of 12 kilocycles is employed for the 2 microsecond pulses generated by the translator, as described above, ground is extended to signal lamp 32 and the lamp is lighted in the early portion of the first positive cycle from alternating current source 31. If the first available control pulse should fail to turn on switch CS there is a very good likelihood that the next succeeding pulse will do so inasmuch as the positive potential across switch CS increases as time advances during the first portion of the positive half cycle from source 31. As soon as lamp 32 turns on and so long as the output of source 31 is positive, lamp 32 remains on and the application of successive control pulses has no effect. As soon as the polarity of source 31 reverses, however, switch CS becomes nonconducting, ground is removed from the lighting circuit, and light 32 turns off. Although the application of the control pulses to the base emitter junction of switch CS may be continued, these pulses will have no effect for the duration of the negative half cycle from source 31. As a result, lamp 32 is made to operate on a substantially fifty percent duty cycle and if a 60 cycle or higher frequency source is employed, the effect on the eye is substantially the same as that of a steady lamp. At the inception of each new positive half cycle from source 31, a coincidence between positive supply current and positive base bias current derived from transformer T results in turning on lamp 32 as previously described.

In accordance with the invention, the conventional necessity for some additional means of switching off a busy lamp upon the termination of a busy condition is avoided. Specifically, if no control pulse is available to bias switch CS, the voltage of supply 31 is insufficient to cause switch CS to become conducting and accordingly lamp 32 remains off.

It is to be understood that the embodiment described herein is merely illustrative of the principles of the invention. Various modifications may be effected by persons skilled in the art without departing from the spirit and scope of the invention.

What is claimed is:

1. In a telephone switching system, a plurality of line circuits, a time division bus, means for generating and storing repetitively a set of signal indicia corresponding to a selected one of said line circuits, means for deriving a train of relatively low duty cycle gating pulses at a relatively high pulse repetition rate from said set of repetitively stored signals, means responsive to said gating pulses for connecting that one of said line circuits corresponding to said set of signal indicia to said bus for the duration of each of said pulses, a signal lamp, a source of alternating current having a frequency substantially lower than said rate, and means jointly responsive to one of said pulses and to a voltage of a particular polarity from said source for applying lighting current from said source to said lamp for at least a part of the half cycle of current from said source having said particular polarity, said last named means being inoperative during half cycles of current of an opposite polarity from said source whereby said lamp is extinguished during said last named half cycles, said last named means being further responsive to the termination of said gating pulses during one of said last named half cycles for maintaining said lamp in the extinguished condition.

2. Apparatus in accordance with claim 1 wherein said current applying means comprises a PNPN triode.

3. Apparatus in accordance with claim 1 including single transformer means for applying said gating pulses to said connecting means and to said current applying means.

4. Apparatus in accordance with claim 3 including filter means interconnecting said transformer means and said current applying means.

5. In a time division telephone switching system, in combination, means for generating gating pulses, a plurality of talking paths, means responsive to said gating pulses for selectively enabling one of said talking paths, a plurality of signal lamps for signaling the condition of said talking paths, a source of alternating current for said lamps, and means jointly responsive to one of said gating pulses and to a voltage of a particular polarity from said source for lighting a corresponding one of said lamps, for maintaining said last named lamp lighted so long as said preselected polarity persists, for extinguishing said lamp upon the change of said source polarity and for maintaining said lamp in the extinguished state upon the return of said source to said particular polarity in the absence of an additional one of said gating pulses.

6. Apparatus in accordance with claim 5 wherein said jointly responsive means comprises a PNPN triode.

7. Apparatus in accordance with claim 5 wherein said gating pulse generating means includes a first translator for converting successively stored binary indicia of a particular one of said paths into a first train of said gating pulses, a second translator for converting successively stored binary indicia of a particular one of said paths into a second train of said gating pulses, the generation of said first or second train being dependent upon whether a station corresponding to a particular one of said paths is a called station or a calling station.

8. Apparatus in accordance with claim 7 including a transformer having a first primary for receiving said first train of gating pulses, a second primary for receiving said second train of gating pulses, a first secondary for applying either said first or second train to said enabling means, and a second secondary for applying either said first or second train to said jointly responsive means.

9. A time division switching system comprising, in combination, means for generating gating signals, a plurality of talking paths including gates responsive to said signals, a plurality of signal lamps for indicating the status of said talking paths, an alternating current source for said lamps, and means jointly responsive to one of said gating signals and to current from said source during a half cycle of a particular polarity for applying said last named current to light a particular one of said lamps, said last named means being further operative to block current from said source to said lamp during half cycles of opposite polarity from said source and to continue to block current from said lamp during succeeding half cycles of said particular polarity from said source in the absence of said gating signals during said succeeding half cycles.

10. A time division switching system comprising, in combination, means for generating gating pulses, a plurality of talking paths including gates responsive to said pulses, a plurality of signal lamps for indicating busy conditions on said talking paths, an alternating current source for said lamps, means responsive to one of said pulses occurring during a half cycle of current of a particular polarity from said source for applying current of said polarity from said source to a particular one of said lamps, said last named means being further operative to block all current from said source to said last named lamp in the absence of one of said pulses during the period of said last named half cycle, whereby each of said lamps is illuminated by a substantially 50 percent current duty cycle from said source during a busy condition on the corresponding one of said talking paths and whereby each of said lamps is automatically extinguished upon the termination of said busy condition.

References Cited

UNITED STATES PATENTS

| | | | |
|---|---|---|---|
| 2,841,657 | 7/1958 | Trousdale | 179—175.2 |
| 2,993,095 | 7/1961 | Arnold et al. | 179—27 |
| 3,101,393 | 8/1963 | Desnoes et al. | 179—27 |

KATHLEEN H. CLAFFY, *Primary Examiner.*

W. COOPER, *Assistant Examiner.*